United States Patent
Lei et al.

(10) Patent No.: US 10,687,356 B2
(45) Date of Patent: Jun. 16, 2020

(54) CHANNEL RESERVATION SIGNAL IN NR SHARED SPECTRUM

(71) Applicant: QUALCOMM Incorporated, San Diego, CA (US)

(72) Inventors: Jing Lei, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/053,154

(22) Filed: Aug. 2, 2018

(65) Prior Publication Data
US 2019/0053269 A1    Feb. 14, 2019

Related U.S. Application Data

(60) Provisional application No. 62/542,560, filed on Aug. 8, 2017.

(51) Int. Cl.
*H04W 74/08* (2009.01)
*H04W 28/26* (2009.01)
*H04W 74/00* (2009.01)
*H04W 72/04* (2009.01)

(52) U.S. Cl.
CPC ........ *H04W 74/004* (2013.01); *H04W 28/26* (2013.01); *H04W 72/0446* (2013.01); *H04W 74/0808* (2013.01); *H04W 74/0833* (2013.01)

(58) Field of Classification Search
CPC ........... H04W 74/004; H04W 74/0833; H04W 72/0446; H04W 28/26; H04W 74/0808; H04W 74/0816
See application file for complete search history.

(56) References Cited

U.S. PATENT DOCUMENTS

| 2016/0095120 | A1  | 3/2016 | Gaal et al. |
| 2016/0127098 | A1* | 5/2016 | Ng ............... H04L 5/0048 370/329 |

(Continued)

FOREIGN PATENT DOCUMENTS

| WO | 2016071148 A1 | 5/2016 |
| WO | 2017111857 A1 | 6/2017 |

OTHER PUBLICATIONS

Kim et al., "An Enhanced Access Reservation Protocol with a Partial Preamble Transmission Mechanism in NB-IoT Systems," IEEE, Jun. 27, 2017, pp. 2270-2273 (Year: 2017).*

(Continued)

*Primary Examiner* — Un C Cho
*Assistant Examiner* — Lalita W Pace

(57) ABSTRACT

Methods, systems, and devices for wireless communication are described. A transmitting device may obtaining channel access after a clear channel assessment (CCA) operation. The transmitting device may then determine an offset between a boundary of a symbol and a particular time at which the channel access is obtained. The transmitting device may generate a channel reservation (CR) preamble based on the offset and transmit the CR preamble. The transmitting device may also generate the CR preamble based on occupancy of sub-bands or beams used by the transmitting device. A receiving device may monitor for a CR message based on the CR preamble.

26 Claims, 13 Drawing Sheets

(56) References Cited

U.S. PATENT DOCUMENTS

| | | | |
|---|---|---|---|
| 2016/0142920 A1* | 5/2016 | Suzuki | H04W 16/14 |
| | | | 370/336 |
| 2016/0242039 A1* | 8/2016 | Drugge | H04W 16/14 |
| 2017/0142743 A1* | 5/2017 | Yoon | H04L 5/0048 |
| 2018/0288801 A1* | 10/2018 | Cierny | H04L 5/0048 |
| 2018/0343589 A1* | 11/2018 | Li | H04W 74/08 |

OTHER PUBLICATIONS

International Search Report and Written Opinion—PCT/US2018/045229—ISA/EPO—dated Oct. 12, 2018.

* cited by examiner

CHANNEL RESERVATION SIGNAL IN NR SHARED SPECTRUM

CLAIM OF PRIORITY UNDER 35 U.S.C. § 119

The present Application for patent claims priority to Provisional Application No. 62/542,560 entitled "CHANNEL RESERVATION SIGNAL IN NR SHARED SPECTRUM" filed Aug. 8, 2017 and assigned to the assignee hereof and hereby expressly incorporated by reference herein.

BACKGROUND

Aspects of the present disclosure relate generally to wireless communication systems and channel reservation procedures.

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

SUMMARY

A wireless device may obtain access to a communication channel or medium after a clear channel assessment (CCA) operation. The wireless device may determine a timing gap or offset between a boundary of an Orthogonal Frequency Division Multiplexing (OFDM) symbol and a particular time at which the channel access is obtained. The wireless device may then generate a channel reservation (CR) preamble based on the offset and transmit the CR preamble. The CR preamble may be adaptive in length such that a following CR message is aligned with symbol timing. The CR signal, which includes the CR preamble and CR message, may be adaptive based on other factors, such as occupancy of particular sub-bands or beams used by the wireless device.

A method of wireless communication is described. The method may include obtaining channel access after a clear channel assessment (CCA) operation, determining an offset between a boundary of a symbol and a particular time at which the channel access is obtained, generating a channel reservation (CR) preamble based on the offset, and transmitting the CR preamble.

A method of wireless communication is described. The method may include obtaining channel access of a communication channel after a clear channel assessment (CCA) operation, wherein the communication channel comprises a plurality of sub-bands, generating at least one channel reservation (CR) signal based on the plurality of sub-bands, and transmitting the at least one CR signal.

A method of wireless communication is described. The method may include obtaining channel access after a clear channel assessment (CCA) operation, generating at least one channel reservation (CR) signal based on availability of beams in a plurality of possible directions, and transmitting the at least one CR signal using one beam in a particular direction among the plurality of possible directions.

A method of wireless communication is described. The method may include receiving a signal, determining that the signal comprises a channel reservation (CR) preamble, monitoring a symbol for a CR message, wherein the symbol follows an ending point of the CR preamble, and identifying channel occupancy information based on the CR message.

An apparatus for wireless communication is described. The apparatus may include a processor, memory in electronic communication with the processor, and instructions stored in the memory and operable, when executed by the processor, to cause the apparatus to obtain channel access after a clear channel assessment (CCA) operation, determine an offset between a boundary of a symbol and a particular time at which the channel access is obtained, generate a channel reservation (CR) preamble based on the offset, and transmit the CR preamble.

A non-transitory computer-readable medium storing code for wireless communication is described. The code may include instructions executable to obtain channel access after a clear channel assessment (CCA) operation, determine an offset between a boundary of a symbol and a particular time at which the channel access is obtained, generate a channel reservation (CR) preamble based on the offset, and transmit the CR preamble.

An apparatus for wireless communication is described. The apparatus may include means for obtaining channel access after a clear channel assessment (CCA) operation, means for determining an offset between a boundary of a symbol and a particular time at which the channel access is obtained, means for generating a channel reservation (CR) preamble based on the offset, and means for transmitting the CR preamble.

In some examples of the method, apparatuses, or non-transitory computer-readable medium described herein, the generating the CR preamble includes partitioning the CR preamble into a plurality of segments, each segment comprising a different waveform. In some cases, the plurality of segments comprises a first segment having a fixed duration, a second segment having a variable duration, and a third segment having a fixed duration. In some cases, the variable duration of the second segment is determined so that a total duration of the CR preamble aligns with a duration of the offset.

In some cases, the generating the CR preamble further comprises applying a different correlation type to each segment, which may include applying an auto correlation type to the first segment and a cross correlation type to the third segment. In some cases, the CR preamble comprises a dual layer waveform construction, and wherein the generating the CR preamble includes using a short spreading sequence for a first layer and a code cover sequence for a second layer of the CR preamble. In some cases, generating the CR preamble includes performing a cross product operation of the code cover sequence denoted by a length L vector with the spreading sequence denoted by a length K vector. In some cases, the offset has a duration shorter than a duration of the CR preamble.

Some examples of the method, apparatuses, or non-transitory computer-readable medium described herein may further include processes, features, means, or instructions for truncating the CR preamble such that the CR preamble has a starting point aligned with the particular time and an ending point aligned with the boundary of the symbol, or aligning an ending point of the CR preamble with a boundary of a next symbol following the symbol and adding a filler signal between the particular time and a beginning of the CR preamble. In some cases, the offset has a duration longer than a duration of the CR preamble. Some examples of the method, apparatuses, or non-transitory computer-readable medium described herein may further include processes, features, means, or instructions for adding at least one filler sample in a gap between an end of the CR preamble and the boundary of the symbol. In some cases, the at least one filler sample comprises at least one of a copy of at least one sample from a beginning of the CR preamble, a copy of at least one sample from an end of a CR message scheduled for transmission in a next symbol following the symbol, or a PN-like signal.

In some examples of the method, apparatuses, or non-transitory computer-readable medium described herein, the at least one CR signal comprises a CR preamble and a CR message in a symbol following an ending point of the CR preamble. In some cases, generating the at least one CR signal comprises generating an independent CR message for each of the plurality of sub-bands. In some cases, a payload of each CR message indicates an occupancy of a particular sub-band on which each CR message is transmitted. In some cases, generating the at least one CR signal comprises generating at least one CR message indicating occupancy of more than one of the plurality of sub-bands. In some cases, a payload of the at least one CR message includes a bitmap indicating occupancy of particular sub-bands of the plurality of sub-bands.

In some examples of the method, apparatuses, or non-transitory computer-readable medium described herein, the at least one CR signal includes a CR message that indicates occupancy information for at least one other beam having a different direction from the particular direction.

In some examples of the method, apparatuses, or non-transitory computer-readable medium described herein, the signal comprises three segments, each segment comprising a different waveform. In some cases, the determining that the signal comprises the CR preamble includes identifying a switching point of a waveform of a first segment of the signal. In some cases, the ending point of the CR preamble is determined based on a switching point of a waveform of a final segment of the signal. In some cases, the signal comprises a dual layer waveform, wherein a first layer comprises a short spreading sequence and a second layer comprises a code cover sequence. In some cases, the ending point of the CR preamble is determined based on detecting particular samples associated with the dual layer waveform. In some cases, the channel occupancy information indicates occupancy of a particular sub-band on which the CR message is received. In some cases, the channel occupancy information indicates occupancy of at least one other sub-band different from a sub-band on which the CR message is received. In some cases, the CR message is received on a beam in a particular direction among a plurality of possible directions. In some cases, the channel occupancy information indicates occupancy of at least one other beam having a different direction from the particular direction.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
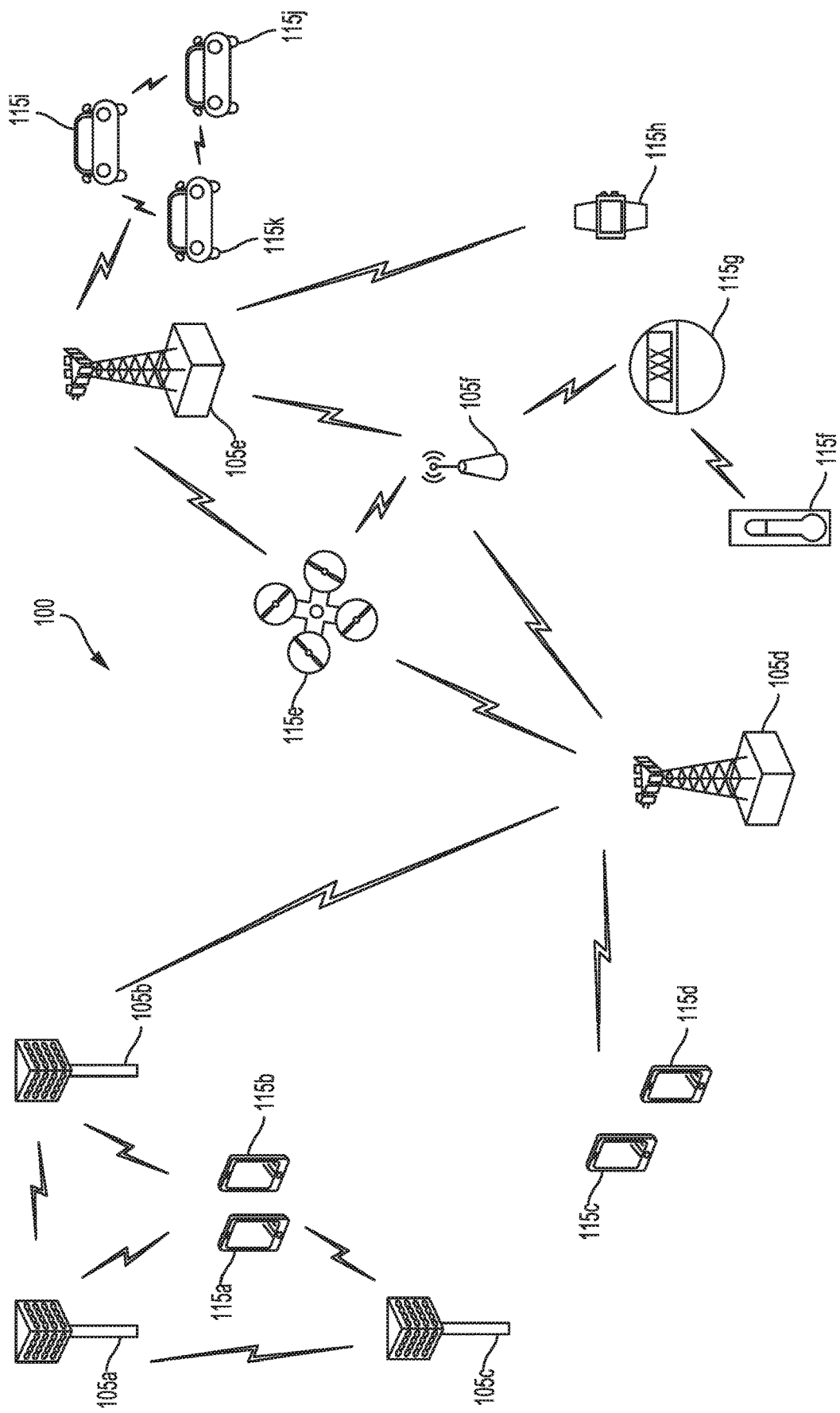
FIG. 1 is a block diagram illustrating details of a wireless communication system.

In wireless communications in a dedicated or licensed communication medium, devices may be scheduled with particular time slots and resources for transmission of data. In an unlicensed or shared communication medium, however, radio frequency spectrum may be available for use by different radio access technologies or multiple mobile network operators. Accordingly, devices may need to contend for medium access using various mechanisms. For example, before a device can begin transmission over an unlicensed communication medium, it may need to determine whether another device is already occupying the medium (i.e., whether signals from other devices are already being transmitted over the medium). In some cases, the device can perform energy detection by persistently listening to the medium for any active radio frequency (RF) energy. If the measured RF energy exceeds a particular threshold, the medium is considered busy, and the device will refrain from transmitting during periods when the medium is busy in order to avoid collisions. In some instances, a device may detect for specific signals in order to determine occupancy of the medium. For example, the device may detect for a preamble of a transmission from another device to determine whether other devices intend to occupy the medium for a certain amount of time.

Such mechanisms for avoiding collisions may be categorized as Listen Before Talk (LBT) procedures because a device listens to the medium to determine whether the medium is busy or not before the device transmits over the medium. LBT procedures may be performed by either a user equipment (UE) or base station for medium access. Among the various LBT procedures used, preamble detection may be more efficient than energy detection for indicating channel occupancy and avoiding collisions. In particular, the medium occupancy time may also be signaled with a preamble, which allows other devices to determine how long the medium will be occupied and avoids unnecessary random access by aggressor devices.

Combinations of energy detection and preamble detection may also be used. In some instances, a clear channel assessment (CCA) procedure is performed prior to transmission over a communication medium, where the CCA procedure may include aspects of both energy detection and preamble detection. Accordingly, once a transmitting device obtains channel access after a successful CCA procedure, it may transmit its own preamble to inform other devices that it intends to occupy the medium for a certain amount of time and allow the other devices to perform their own CCA procedures and detect for signals (i.e., preambles). In particular, the preamble transmitted by the transmitting device may be part of a channel reservation (CR) signal, which may include at least a CR preamble and a CR message. As used herein, a successful CCA procedure, or CCA clearance, may include the result of a procedure performed by a wireless device in which the wireless device determines that a communication medium is considered not occupied by communications from other devices (e.g., via energy detection and/or preamble detection) and is available for communication by the wireless device.

The CR preamble may indicate to other devices, such as potential aggressors, that a CR message is forthcoming. A transmitting device may send the CR preamble after a CCA procedure that indicates an available communication medium is completed, and then a CR message following the CR preamble, where the CR message may include a network allocation vector (NAV), a packet length, and/or beam training information. In some instances, the NAV indicates a duration of the channel occupancy time of the transmitting device and informs other devices the length of time for which they should defer from accessing the medium. In some implementations, the transmitting device may re-use a Physical Downlink Control Channel (PDCCH) and Demodulation Reference Signal (DMRS) format for the CR message to maximize inter-operability between licensed and unlicensed design.

In some instances, cellular communication systems may use a transmission timeline comprising Orthogonal Frequency Division Multiplexing (OFDM) symbols according to a fixed pattern. In particular, Long Term Evolution (LTE) and 5G New Radio (NR) systems may partition time resources into equally spaced symbols for scheduling of resources and synchronizing transmissions among devices within a network. In unlicensed spectrum, however, devices perform channel contention procedures before obtaining medium access, and medium access can be obtained at any time, including between symbol boundaries. In some instances, a LTE or NR device may compete with non-cellular devices, such as WLAN devices that do not operate under a similar time-partitioned symbol timeline, for medium access. Accordingly, a cellular device may obtain medium access (e.g., successful CCA procedure) at any time, but its transmissions, including CR message transmissions, may still need to follow a particular transmission timeline in accordance with system parameters.

To improve reliable and energy-efficient CR signal detection, a transmitting device may adapt its CR signal transmission to account for the gap between medium access timing (i.e., CCA clearance) and ODFM symbol boundaries in accordance with system timing, the difference between a system bandwidth of the transmitting device and a system bandwidth of potential aggressors, or differences of channel occupancy across different sub-bands and/or beam directions. In particular, techniques and apparatuses described herein provide for adaptive transmission of CR signals in unlicensed or shared spectrum. For example, a transmitting device may adapt a CR preamble based on an offset (i.e., gap) between a time at which channel access is obtained by the transmitting device and a following symbol boundary. The adaptive generation of the CR preamble may allow a following CR message to be transmitted in accordance with a predefined system timing and allow other devices to identify a particular symbol at which to expect the CR message. Further, in instances where bandwidth may be further divided into sub-bands and the occupancy duration by a device may differ across different sub-bands, the CR message may be adapted to indicate information regarding occupancy of multiple sub-bands. In other instances where a device may transmit beams in different directions, the CR message may be adapted to indicate information regarding occupancy of different beams.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1M nodes/km2), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth, for example. For other various indoor wideband implementations, using a TDD over the unlicensed portion of the 5 GHz band, the subcarrier spacing may occur with 60 kHz over a 160 MHz bandwidth, for example. Finally, for various deployments transmitting with mmWave components at a TDD of 28 GHz, subcarrier spacing may occur with 120 kHz over a 500 MHz bandwidth, for example. Other deployments of different subcarrier spacing over different bandwidths are also within the scope of the present disclosure.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs may allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating a network 100 including various base stations and UEs configured according to aspects of the present disclosure. In some instances, the network 100 represents a 5G network, for example. The network 100 includes a number of evolved node Bs (eNBs) 105 and other network entities. An eNB may be a station that communicates with the UEs and may also be referred to as a base station, an access point, a gNB, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105d and 105e are regular macro eNBs, while eNBs 105a-105c are macro eNBs enabled with one of 3 dimension (3D), full dimension (FD), or massive MIMO. eNBs 105a-105c take advantage of their higher dimension MIMO capabilities to exploit 3D beamforming in both elevation and azimuth beamforming to increase coverage and capacity. eNB 105f is a small cell eNB which may be a home node or portable access point. An eNB may support one or multiple (e.g., two, three, four, and the like) cells.

The network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115a-115d are examples of mobile smart phone-type devices accessing network 100. A UE may also be a machine specifically configured for connected communication, including machine type communication (MTC), enhanced MTC (eMTC), narrowband IoT (NB-IoT) and the like. UEs 115e-115k are examples of various machines configured for communication that access network 100. A UE may be able to communicate with any type of the eNBs, whether macro eNB, small cell, or the like. In FIG. 1, a lightning bolt (e.g., communication links) indicates wireless transmissions between a UE and a serving eNB, which is an eNB designated to serve the UE on the downlink and/or uplink, or desired transmission between eNBs, and backhaul transmissions between eNBs.

The communication links depicted in FIG. 1 may include communication links in licensed, unlicensed, or shared radio frequency (RF) spectrum. In some instances, a shared spectrum band may refer to spectrum that is lightly licensed and/or in which there may be some level of coordination among communications of different radio access technologies (RATs) or some level of preference given to communications of a particular RAT, such as an incumbent RAT, for example. In other instances, a shared spectrum band may generally refer to spectrum in which different RATs coexist or operate within the same RF spectrum band, which may include lightly licensed/coordinated spectrum or, alternatively, purely unlicensed spectrum in which different RATs may freely contend for access to the channel medium using various channel contention techniques. The aspects described in the present disclosure may be applicable to various shared or unlicensed spectrum regimes. Accordingly, the terms shared spectrum and unlicensed spectrum are used interchangeably herein unless otherwise noted.

In operation at network 100, eNBs 105a-105c serve UEs 115a and 115b using 3D beamforming and coordinated spatial techniques, such as coordinated multipoint (CoMP) or multi-connectivity. Macro eNB 105d performs backhaul communications with eNBs 105a-105c, as well as small cell, eNB 105f. Macro eNB 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Network 100 also supports mission critical communications with ultra-reliable and redundant links for mission critical devices, such as UE 115e, which is a drone in the example depicted in FIG. 1. Redundant communication links with UE 115e include from macro eNBs 105d and 105e, as well as small cell eNB 105f. Other machine type devices, such as UE 115f (thermometer), UE 115g (smart meter), and UE 115h (wearable device) may communicate through network 100 either directly with base stations, such as small cell eNB 105f, and macro eNB 105e, or in multi-hop configurations by communicating with another user device which relays its information to the network, such as UE 115f communicating temperature measurement information to the smart meter, UE 115g, which is then reported to the network through small cell eNB 105f. Network 100 may also provide additional network efficiency through dynamic, low-latency TDD/FDD communications, such as in a vehicle-to-vehicle (V2V) mesh network between UEs 115i-115k communicating with macro eNB 105e.

In shared spectrum configurations, wireless devices such as base station 105 and UE 115 may need to determine that the shared medium is clear before transmitting over the medium. The wireless devices may also transmit channel reservation signals once channel access has been obtained to signal to other devices and potential aggressors that the channel has been reserved for a particular duration. Due to the contentious nature of shared spectrum and coexistence with various types of RATs, base station 105 or UE 115 may obtain channel access between OFDM symbol boundaries. Accordingly, base station 105 or UE 115 may use an adaptive channel reservation (CR) preamble based on the offset between a time at which channel access is obtained and the OFDM symbol boundary in accordance with system timing. The adaptive CR preamble may indicate to other devices (e.g., potential aggressors) that a CR message is forthcoming and allow for transmission of the CR message to align with an OFDM symbol boundary. The CR signal, which includes the CR preamble and CR message, may also be adapted based on the sub-bands or directional beams used by base station 105 or UE 115 for transmissions, as will be described in further detail herein.

The techniques described herein relate to transmission of CR signals by a wireless device before the wireless device intends to transmit further signals. Accordingly, the wireless device that transmits the CR signal may be referred to in the present disclosure as a "transmitting device," which may be any wireless device, including a base station 105 or a UE 115.

Figure 2:
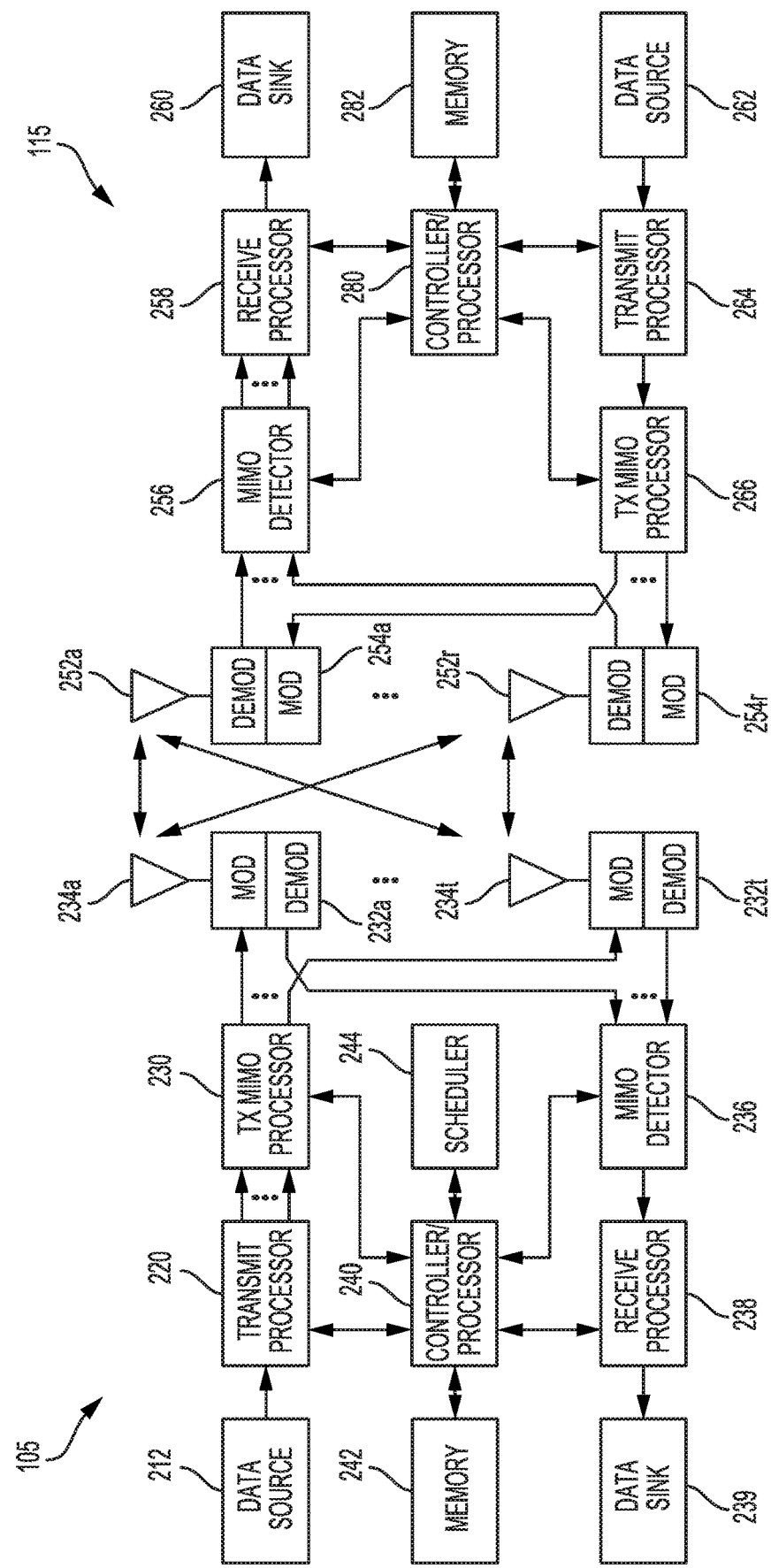
FIG. 2 is a block diagram illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. At the eNB 105, a transmit processor 220 may receive data from a data source 212 and control information from a controller/processor 240. The control information may be for various control channels such as the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of the functional blocks illustrated in FIGS. 10-13, and/or other various processes for the techniques described herein. The controllers/processor 280 and/or other processors and modules at the UE 115 may also perform or direct the execution of the functional blocks illustrated in FIGS. 10-13, and/or other processes for the techniques described herein. The memories 242 and 282 may store data and program codes for the eNB 105 and the UE 115, respectively. For example, memory 242 may store instructions that, when performed by the processor 240 or other processors depicted in FIG. 2, cause the base station 105 to perform operations described with respect to FIGS. 10-13. Similarly, memory 282 may store instructions that, when performed by processor 280 or other processors depicted in FIG. 2, cause the UE 115 to perform operations described with respect to FIGS. 10-13. A scheduler 244 may schedule UEs for data transmission on the downlink and/or uplink.

While blocks in FIG. 2 are illustrated as distinct components, the functions described above with respect to the blocks may be implemented in a single hardware, software, or combination component or in various combinations of components. For example, the functions described with respect to the transmit processor 220, the receive processor 238, or the TX MIMO processor 230 may be performed by or under the control of processor 240.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in inefficient communications, especially if channel contention procedures involve only energy detection, for example.

In some instances, wireless devices may send a channel reservation (CR) signal, comprising a CR preamble and a CR message, in order to indicate to potential aggressors that the transmitting device will occupy the shared spectrum for a particular amount of time. Before the transmitting device sends the CR signal, it may first need to clear a CCA procedure to obtain access to the shared spectrum. The time at which the transmitting device clears the CCA procedure, however, may not align with an OFDM symbol boundary of the system in which the transmitting device operates, while the transmitting device may still need to transmit the CR message in accordance with system timing. Accordingly, the transmitting device may use an adaptive CR signal that accounts for the potential offset between the time at which it obtains access to the shared spectrum and an OFDM symbol boundary.

Figure 3:
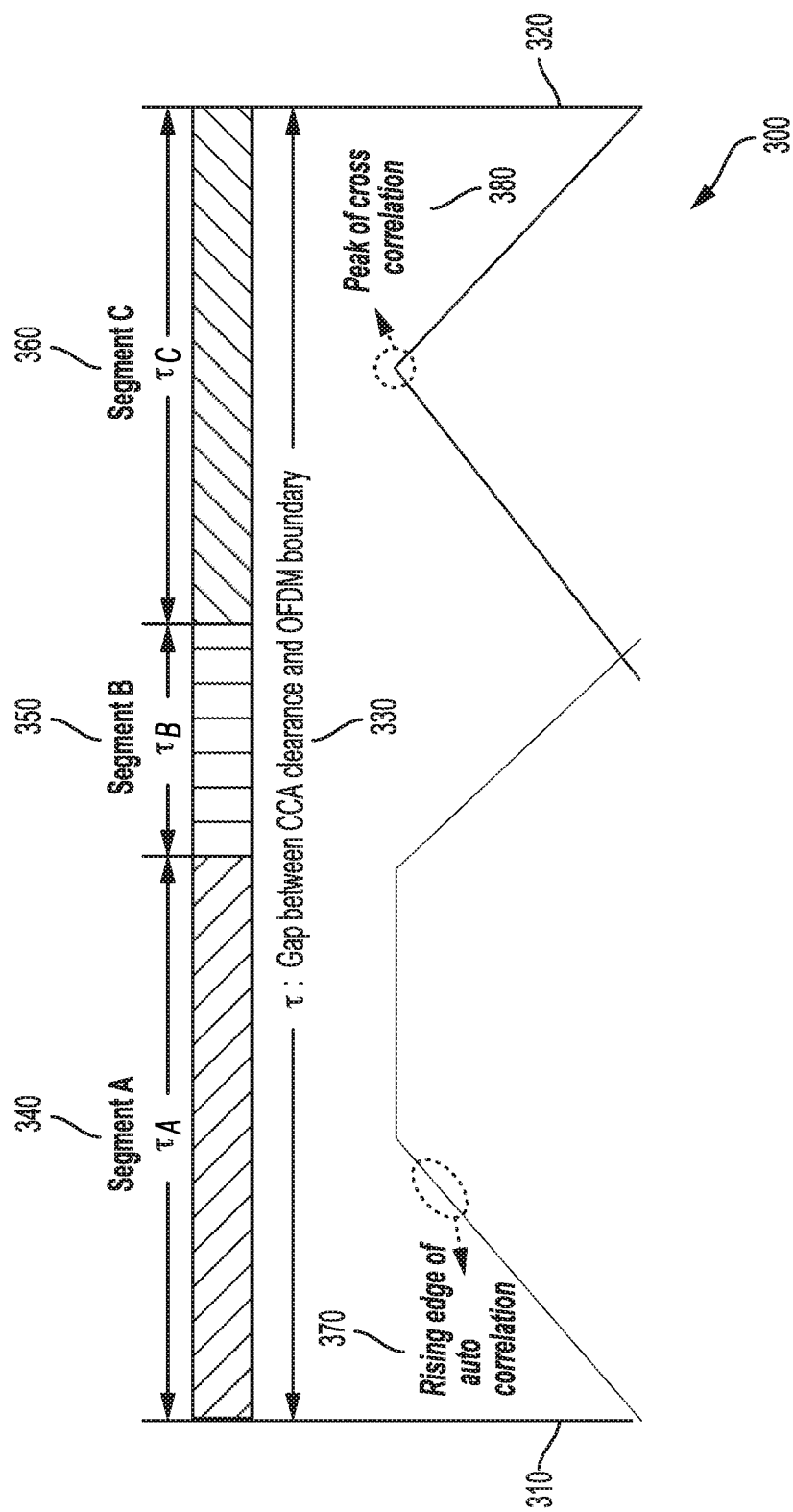
FIG. 3 illustrates an example of an adaptive channel reservation (CR) preamble.

FIG. 3 illustrates an example in which a transmitting device, such as base station 105 or UE 115, may adapt a preamble length based on the offset between a time at which a CCA procedure determines the medium is clear (i.e., CCA clearance) and an OFDM symbol boundary. For example, as depicted in FIG. 3, the transmitting device may obtain channel access at time 310, which is not aligned with an OFDM symbol boundary. The next OFDM symbol boundary in the illustrated example occurs at time 320. The transmitting device may accordingly generate CR preamble 300 such that the length of the CR preamble 300 spans an offset 330, or the time gap, between time 310 and time 320. In particular, the transmitting device may partition CR preamble 300 into three segments 340, 350, and 360, where the CR preamble 300 comprises a different waveform in each segment.

The different waveforms in each segment may have different properties that allow for a receiver of the CR preamble 300 to efficiently identify the signal as a CR preamble and monitor for the following CR message at the appropriate time. In some instances, the transmitting device may apply different correlation types or filters such that the CR preamble 300 exhibits different properties in different segments. For example, an auto correlation type may be applied to a waveform of the first segment 340. As a result, the properties of the CR preamble signal in segment 340 may include a gradual rising edge 370, which may allow a receiver of the CR preamble 300 to detect the presence of the CR preamble 300 over the transmission medium and determine a general starting point of the CR preamble 300.

The transmitting device may apply a different correlation type to the CR preamble 300 signal in segment 360, however. In some instances, the transmitting device may apply a cross correlation type to a waveform of the third segment 360. Based on the cross correlation type applied, the CR preamble 300 waveform in segment 360 may have a sharp peak 380, which may indicate to a receiver of the CR preamble 300 a definite ending point of the CR preamble 300 and allow the receiver to identify a specific OFDM symbol boundary at which to begin monitoring for a following CR message at time 320.

The transmitting device may further apply a different correlation type to the CR preamble 300 signal in segment 350. The correlation type applied to segment 350 may be one of a plurality of correlation types, and selected such that at least a minimum signal is transmitted across the medium to indicate the presence of the CR preamble 300. Further, the length of the CR preamble 300 waveform in segment 350 may be variable, with length adapted based on the offset 330. Accordingly, while the length of segments 340 and 360 may be fixed or deterministic, the length of segment 350 may be vary depending on the offset 330 and may have longer or shorter duration in order to allow the entire CR preamble 300 signal to span the length of the offset 330.

Figure 4:
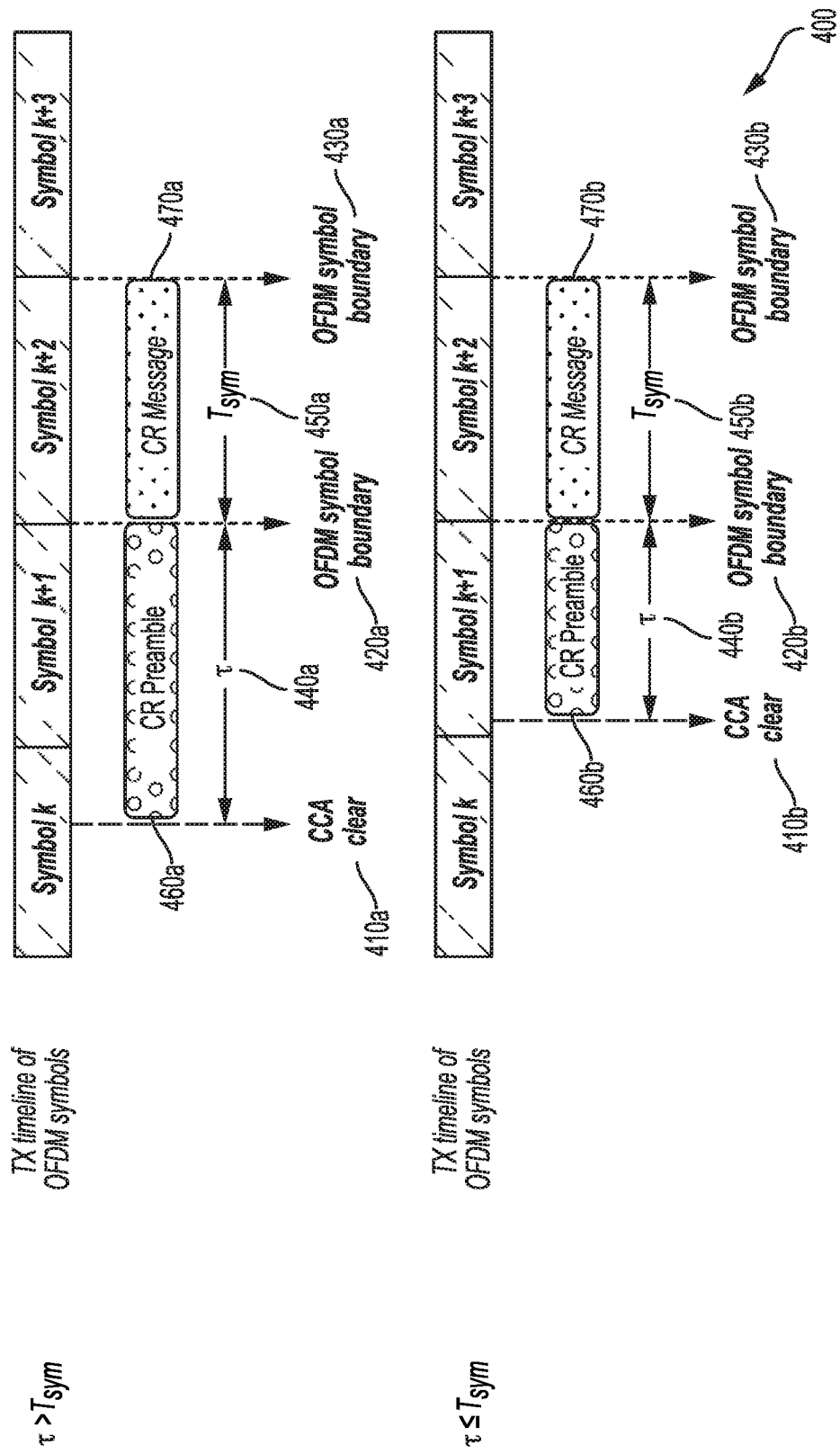
FIG. 4 illustrates example configurations of adaptive CR signals based on medium access timing.

FIG. 4 illustrates example configurations 400 of adaptive CR preamble lengths based on the time at which a CCA clearance procedure is completed in relation to OFDM symbol timing. In some instances, the CR preamble lengths may be adapted using techniques described above with respect to FIG. 3. In the illustrated example, a transmitting device may obtain channel access at time 410a during symbol k after a CCA clear procedure is complete. The offset 440a between the CCA clear 410a and the following available OFDM symbol boundary 420a may be greater than one symbol length 450a (i.e., the symbol boundary of symbol k may not be under consideration in this instance because the CR preamble 460a may need a minimum length of time for proper decoding at the receiver). Accordingly, the transmitting device may adapt a length of the CR preamble 460a so that it spans the length of time between time 410a and 420a. Once the CR preamble 460a is transmitted, the transmitting device transmits the CR message 470a in the following symbol at symbol k+2. In the present example, the CR message 470a may span one symbol length between symbol boundaries 420a and 430a.

In a second example illustrated in FIG. 4, the transmitting device may obtain channel access at time 410b during symbol k+1 after a CCA clearance procedure is complete. The offset 440b between the CCA clear 410b and the following available OFDM symbol boundary 420b may be less than one symbol length 450b. Accordingly, the transmitting device may adapt a length of the CR preamble 460b so that it spans the length of time between time 410b and 420b. Once the CR preamble 460b is transmitted, the transmitting device transmits the CR message 470b in the following symbol at symbol k+2. In the present example, the CR message 470b may span one symbol length between symbol boundaries 420b and 430b.

Figure 5:
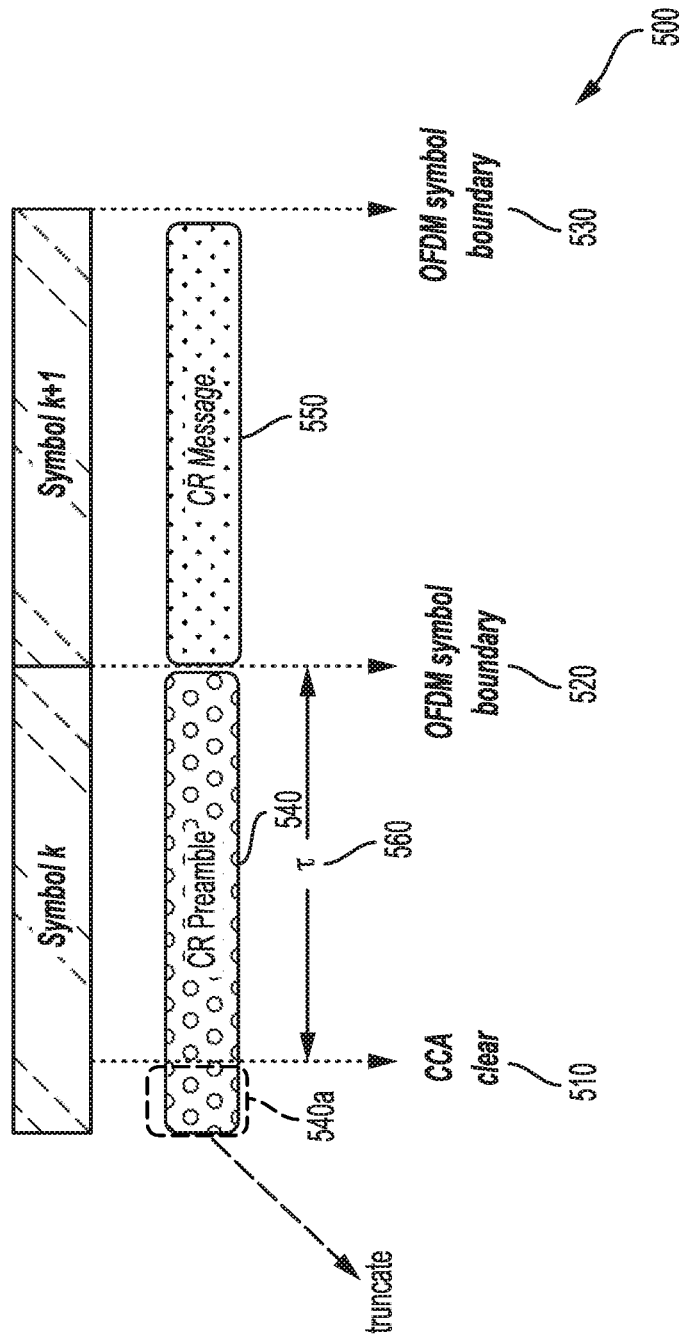
FIG. 5 illustrates an example configuration of an adaptive CR signal based on medium access timing.
Figure 6:
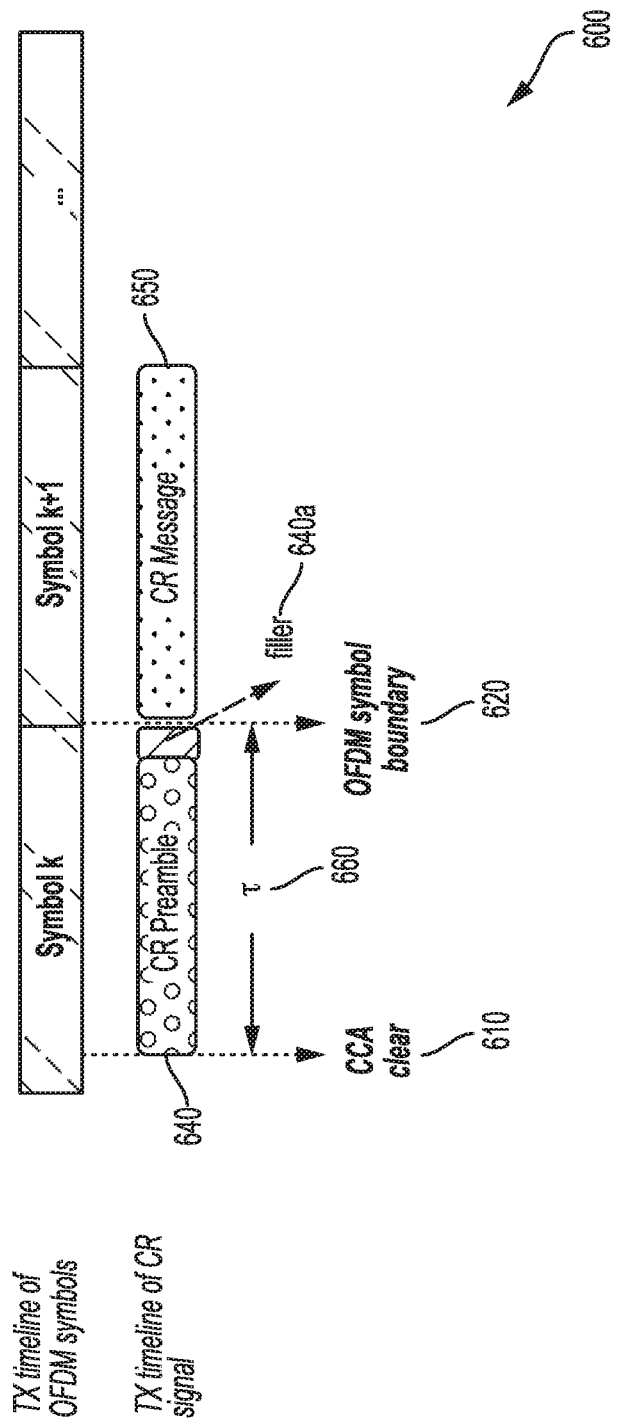
FIG. 6 illustrates an example configuration of an adaptive CR signal based on medium access timing.

Other techniques for adaptive CR preamble generation are depicted in FIGS. 5 and 6. Instead of generating a CR preamble of multiple segments with different correlation properties, a transmitting device may generate a CR preamble of a particular length. In some implementations, the CR preamble may comprise a dual layer waveform construction, where a short spreading sequence is used for a first layer and a code cover sequence is used for a second layer. In the first layer, a short spreading sequence with time duration T0 is used with a sampling rate of FS=K/T0, with the spreading sequence denoted by a length K vector $S \triangleq [s_1 \; s_2 \ldots s_K]$. Examples of the type of sequence that may be used may include CAZAC, Pseudo-Noise (PN), Walsh code, Golay code, etc. The second layer may include a length L code cover sequence, where LT0 spans an integer number of OFDM symbols. The code cover sequence may be denoted by a size L vector $B \triangleq [b_1 \; b_2 \ldots b_L]$. The preamble waveform samples (P) can be generated by cross product of spreading code cover B with sequence S, where $P=B \times S=[b_1 s_1 b_1 s_2 \ldots b_1 s_K \; b_2 s_1 b_2 s_2 \ldots b_2 s_K \ldots b_L s_1 b_L s_2 \ldots b_L s_K]$.

The dual layer waveform CR preamble may span a fixed length of LK. FIG. 5, however, illustrates an example 500 in which an offset between a time at which channel access is obtained and a following OFDM symbol boundary is less than the CR preamble length. As depicted in FIG. 5, in some instances a transmitting device may obtain channel access at a time 510 that does not align with an OFDM symbol boundary. If the gap or offset τ 560 between the CCA clear time 510 and a following OFDM symbol boundary 520 of symbol k is less than the CR preamble 540 length LK, the transmitting device may truncate the CR preamble 540 by a certain number of samples 540a, and transmit the truncated CR preamble 540 with the last sample of the CR preamble 540 aligned with the OFDM symbol boundary 520 of symbol k. In the illustrated example, the number of samples truncated is the first LK−τ samples. The CR message 550 is then transmitted in the following symbol k+1.

FIG. 6 illustrates an example 600 in which the offset T between a time at which channel access is obtained and a following OFDM symbol boundary may be a longer duration than a preamble length. Here, a transmitting device determines at time 610 that the transmission medium is clear based on a CCA procedure. In the illustrated example, the offset τ 660 between time 610 and a following OFDM symbol boundary 620 of symbol k is greater than a CR preamble 640 length LK. In this instance, the transmitting device may align the CR preamble 640 to start at time 610, and then add filler samples 640a after the end of the CR preamble 640 until the OFDM symbol boundary 620. Various options may be used for the filler samples 640a. For example, the transmitting device may use a copy of the first τ−LK samples of the CR preamble 640 or a copy of the last τ−LK samples of the CR message 650. Alternatively, the transmitting device may use a PN-like signal for the filler samples. Further, the CR preamble 640 may be adapted such that it has a minimum duration, notwithstanding OFDM symbol boundaries that may intersect the CR preamble 640.

As described above, techniques for adaptive CR signal generation may include adapting a CR preamble to account for potential timing differences between when channel access is obtained and OFDM symbol boundaries of the system in which the transmitting device operates. A CR signal may also be adapted based on occupancy of different partitions of bandwidth used by a transmitting device. In particular, the bandwidth available to devices in a shared spectrum may be partitioned into equally spaced sub-bands to support channelization and make full use of shared resources. For example, in mmWave bands (e.g., 60 GHz), a 1 GHz system bandwidth may be partitioned into two sub-bands of 500 MHz each. In another example, for the 3.5 GHz band, an 80 MHz system bandwidth may be partitioned into four sub-bands of 20 MHz each. Each of the sub-bands may have different occupancy, including different occupancy associated with the same device. Accordingly, a device may reserve the channel for different sub-bands for different amounts of time, and CR signals may be sent for various combinations of sub-bands.

Figure 7:
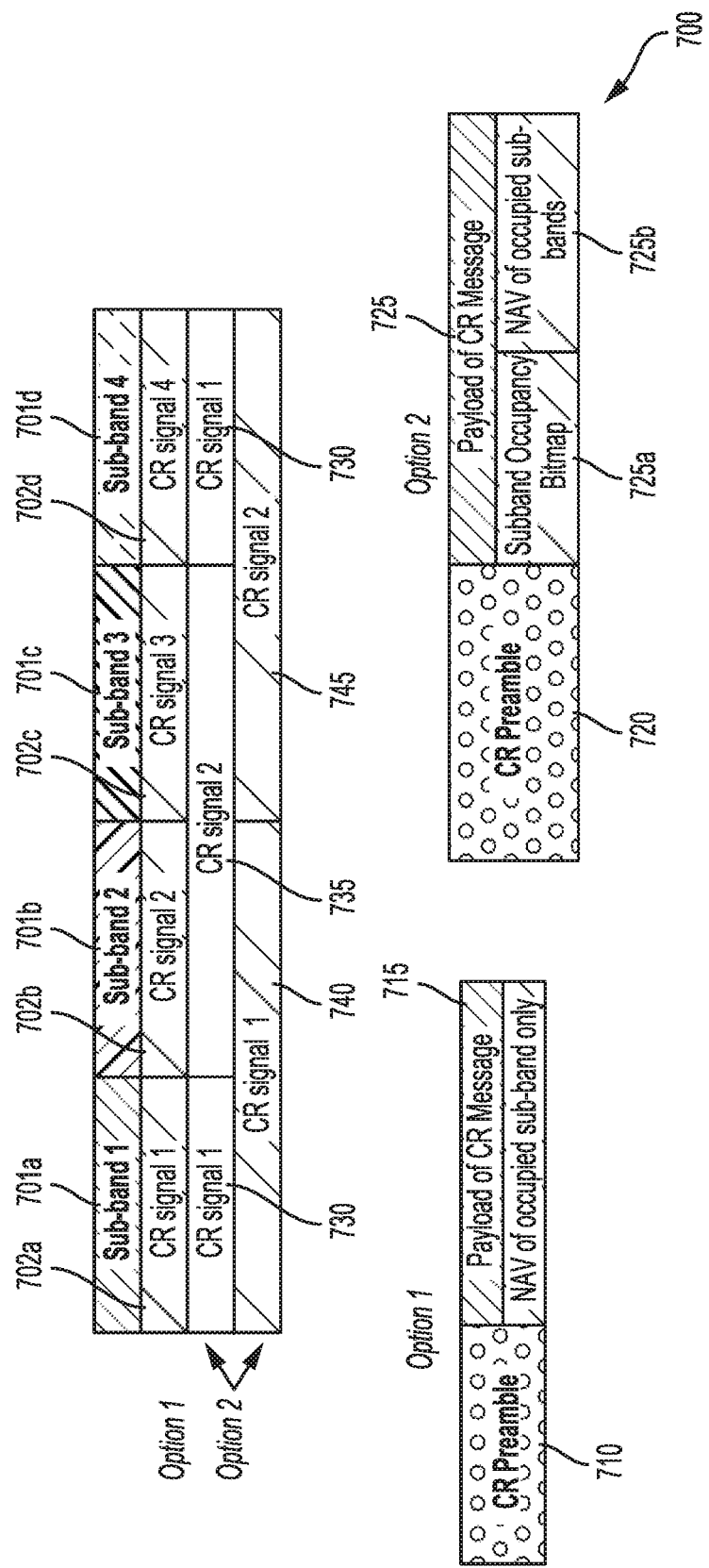
FIG. 7 illustrates example configurations of adaptive CR signals based on sub-band occupancy.

For example, FIG. 7 depicts example configurations 700 for adaptive CR signal generation based on occupancy of different sub-bands within an available bandwidth. In the illustrated example, a channel is partitioned into four sub-bands 701a, 701b, 701c, and 701d. A transmitting device may occupy each of the sub-bands at different times and for different durations. Accordingly, in some instances, the transmitting device may send a different and independent CR signal on each sub-band, where the CR signal indicates occupancy for the particular sub-band on which the CR signal is sent. In this configuration, a same CR preamble 710 is transmitted across each sub-band, and a payload of the CR message 715 includes information regarding occupancy for the sub-band on which the CR message 715 is sent. For example, a CR signal 702a transmitted on sub-band 701a would include a CR message payload 715 with a NAV value that indicates occupancy of sub-band 701a by the transmitting device. Similarly, a CR signal 702b transmitted on sub-band 701b would include a CR message payload 715 with a NAV value that indicates occupancy of sub-band 701b by the transmitting device, and so forth for sub-bands 701c and 701d.

In other instances, a CR signal may include correlated occupancy information for multiple or combinations of sub-bands. For example, a CR signal 730 transmitted on sub-band 701a may include a CR preamble 720 that is the same across each sub-band, while also including a payload CR message 725 that contains occupancy information regarding multiple sub-bands. In some instances, the CR message 725 may include a sub-band occupancy bitmap 725a that indicates the sub-bands for which the CR message 725 applies. In the illustrated example, CR signal 730 would include a sub-band occupancy bitmap 725a that indicates the occupancy information contained therein applies to both sub-band 701a and sub-band 701d, while CR signal 735 would include a sub-band occupancy bitmap 725a that indicates the occupancy information contained therein applies to both sub-band 701b and sub-band 701c. The CR message 725 may also include a NAV value 725b indicating occupancy of the sub-bands indicated by the sub-band occupancy bitmap 725a. As depicted in FIG. 7, the occupancy of various sub-bands may change over time. Accordingly, the transmitting device may send CR signals for a different combination of sub-bands. For example, a transmitting device may later send a CR signal 740 indicating occupancy of sub-bands 701a and 701b and a CR signal 745 indicating occupancy of sub-bands 701c and 701d.

Figure 8:
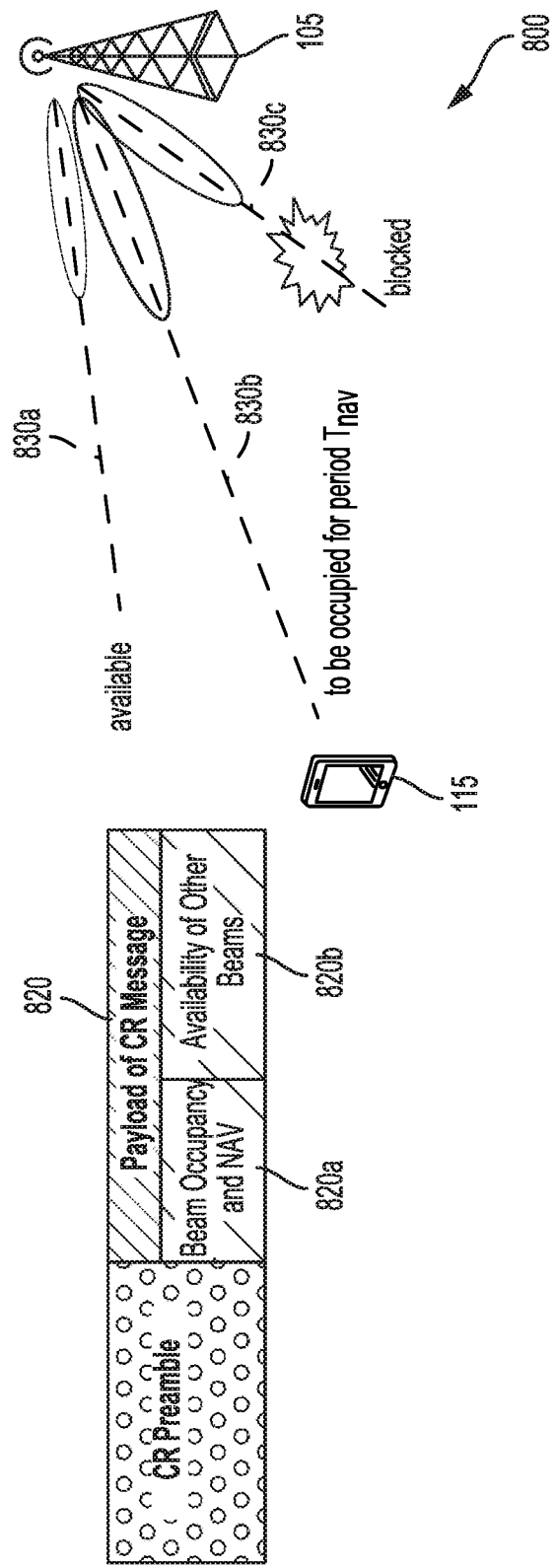
FIG. 8 illustrates an example configuration of an adaptive CR signal based on beam direction availability.

A CR signal may also be adapted based on occupancy of different directional beams. For example, a transmitting device may transmit a beam or signal in one particular direction among a plurality of possible directions. The CR signal sent by the transmitting device may include occupancy information for one or more of the possible directions in which the beam is sent. FIG. 8 illustrates an example configuration 800 for adaptive CR signals based on occupancy of different beams. In the illustrated example, the transmitting device is a base station 105 that may transmit a beam in one or more of three different directions 830a, 830b, and 830c. The channel over direction 830a may be available, while beam 830b is to be reserved for a period Tnav for a transmission to UE 115. Beam 830c may be blocked due to interference or other factors. In this instance, transmitting device 105 may send a CR signal comprising a CR preamble 810 and CR message 820. The payload of the CR message 820 may indicate a beam occupancy and NAV 820a for beam 830b, as well as availability 820b of other beams 830a and 830c. Accordingly, the transmitting device may adaptively generate CR signals to indicate reservation as well as availability of multiple beam directions.

Figure 9:
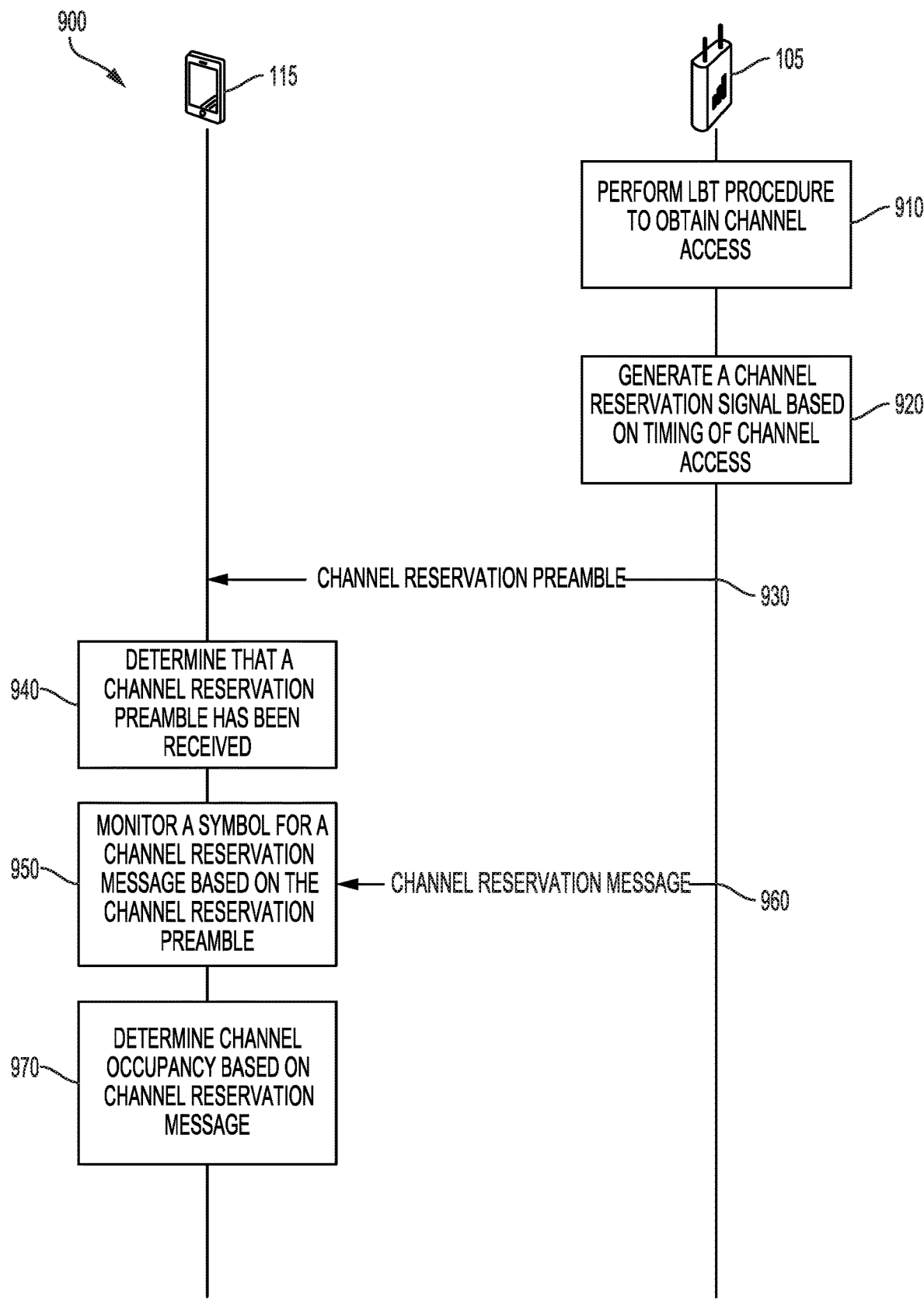
FIG. 9 illustrates an example process flow in a system that supports adaptive CR signaling techniques.

FIG. 9 illustrates an example of a process flow 900 in a system that supports adaptive channel reservation signal techniques in accordance with aspects of the present disclosure. Process flow 900 may include base station 105 and UE 115, which may be examples of the corresponding devices described with reference to FIGS. 1-2.

At 910, a transmitting device such as base station 105 performs an LBT procedure to obtain channel access. In the present example, the transmitting device is base station 105, but the transmitting device may also be UE 115, and the operations described with respect to base station 105 herein may be performed by UE 115 as well. Similarly, the receiving device in the present example is UE 115, but the receiving device may also be base station 105.

At 920, the base station 105 generates a channel reservation signal based on obtaining channel access. The channel reservation signal may be based on a timing at which channel access is obtained. For example, the waveforms used or number of samples included in a channel reservation preamble may be based on an offset between a time at which channel access is obtained and a symbol boundary of the system in which base station 105 and UE 115 operate. Additionally or alternatively, the channel reservation signal may be based on other factors, such as the occupancy of various sub-bands or beams available to the base station 105.

At 930, the base station 105 transmits the channel reservation preamble to the UE 115. At 940, the UE 115 determines that the signal received is a channel reservation preamble, and will then monitor a particular symbol for a following channel reservation message based on the received channel reservation preamble at 950. The UE 115 may then receive the channel reservation message transmitted by base station 105 at 960.

At 970, the UE 115 determines channel occupancy based on the payload of the channel reservation message. In some instances, the UE 115 may determine occupancy of different sub-bands or beam directions based on the channel reservation message.

Figure 10:
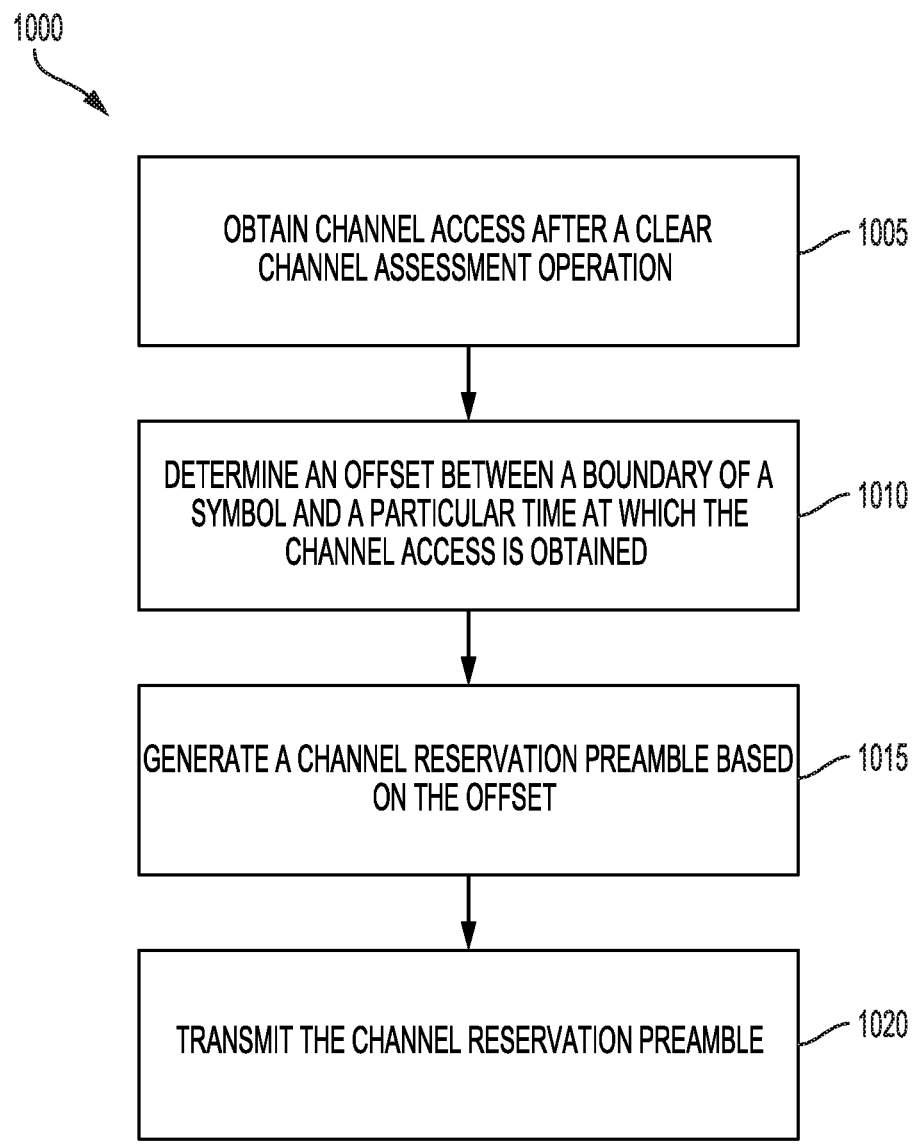
FIG. 10 illustrates a method for transmission of adaptive CR signaling in accordance with aspects of the present disclosure.

FIG. 10 shows a flowchart illustrating a process 1000 for adaptive channel reservation signals in accordance with various aspects of the present disclosure. The operations of process 1000 may be implemented by a device such as a base station or its components, or a UE or its components, as described with reference to FIGS. 1 and 2. For example, the operations of process 1000 may be performed by the processor 240 or processor 280, either alone or in combination with other components, as described herein. In some examples, the base station 105 or UE 115 may execute a set of codes to control the functional elements of the device to perform the functions described below. Additionally or alternatively, the base station 105 or UE 115 may perform aspects of the functions described below using special-purpose hardware.

At 1005, the base station 105 or UE 115 obtains channel access after a clear channel assessment operation. At 1010, the base station 105 or UE 115 determines an offset between a boundary of a symbol and a particular time at which the channel access is obtained. At 1015, the base station 105 or UE 115 generates a channel reservation preamble based on the offset, as described above with reference to FIG. 3, 4, 5, or 6. At 1020, the base station 105 or UE 115 transmits the channel reservation preamble.

Figure 11:
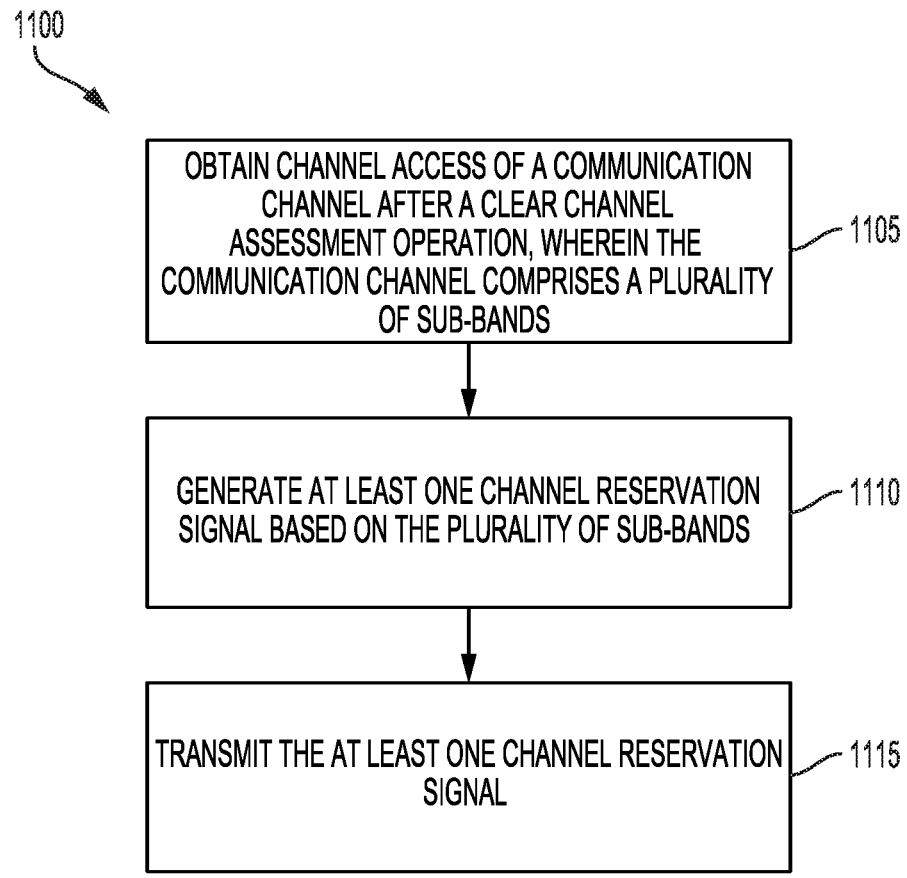
FIG. 11 illustrates a method for transmission of adaptive CR signaling in accordance with aspects of the present disclosure.

FIG. 11 shows a flowchart illustrating a process 1100 for adaptive channel reservation signals in accordance with various aspects of the present disclosure. The operations of process 1100 may be implemented by a device such as a base station or its components, or a UE or its components, as described with reference to FIGS. 1 and 2. For example, the operations of process 1100 may be performed by the processor 240 or processor 280, either alone or in combination with other components, as described herein. In some examples, the base station 105 or UE 115 may execute a set of codes to control the functional elements of the device to perform the functions described below. Additionally or alternatively, the base station 105 or UE 115 may perform aspects of the functions described below using special-purpose hardware.

At 1105, the base station 105 or UE 115 obtains channel access of a communication channel after a clear channel assessment operation, wherein the communication channel comprises a plurality of sub-bands. At 1110, the base station 105 or UE 115 generates at least one channel reservation signal based on the plurality of sub-bands, as described above with reference to FIG. 7. At 1115, the base station 105 or UE 115 transmits the at least one channel reservation signal.

Figure 12:
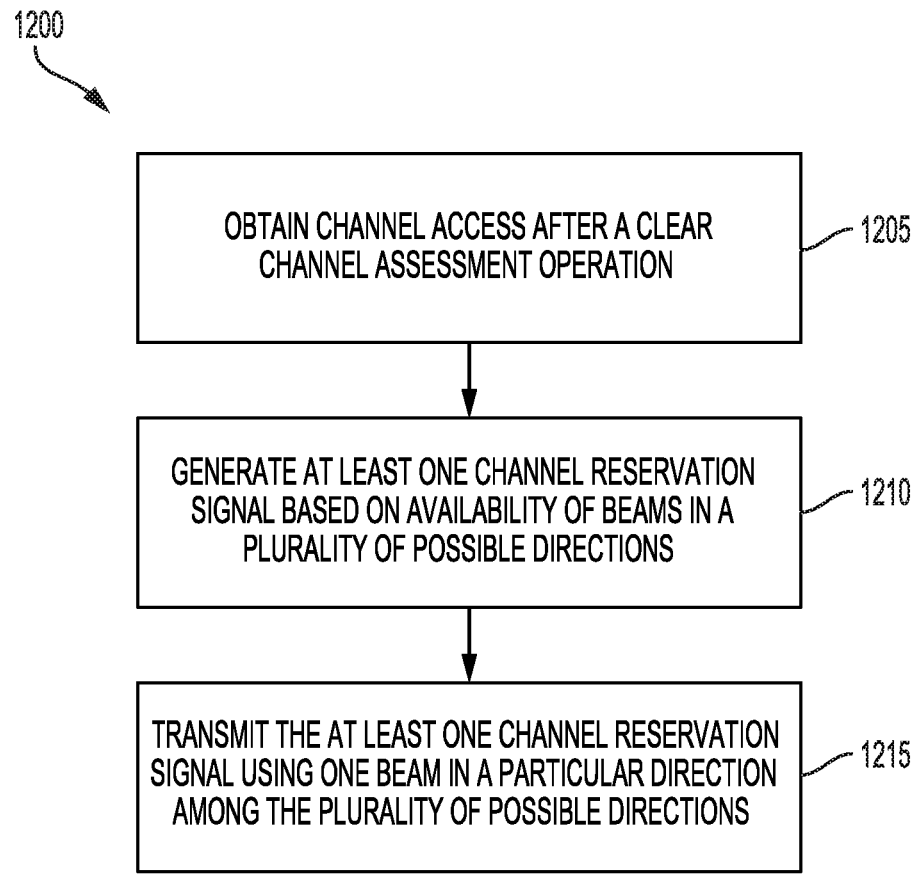
FIG. 12 illustrates a method for transmission of adaptive CR signaling in accordance with aspects of the present disclosure.

FIG. 12 shows a flowchart illustrating a process 1200 for adaptive channel reservation signals in accordance with various aspects of the present disclosure. The operations of process 1200 may be implemented by a device such as a base station or its components, or a UE or its components, as described with reference to FIGS. 1 and 2. For example, the operations of process 1200 may be performed by the processor 240 or processor 280, either alone or in combination with other components, as described herein. In some examples, the base station 105 or UE 115 may execute a set of codes to control the functional elements of the device to perform the functions described below. Additionally or alternatively, the base station 105 or UE 115 may perform aspects of the functions described below using special-purpose hardware.

At 1205, the base station 105 or UE 115 obtains channel access after a clear channel assessment operation. At 1210, the base station 105 or UE 115 generate at least one channel reservation signal based on availability of beams in a plurality of possible directions, as described above with reference to FIG. 8. At 1215, the base station 105 or UE 115 transmits the at least one channel reservation signal using one beam in a particular direction among the plurality of possible directions.

Figure 13:
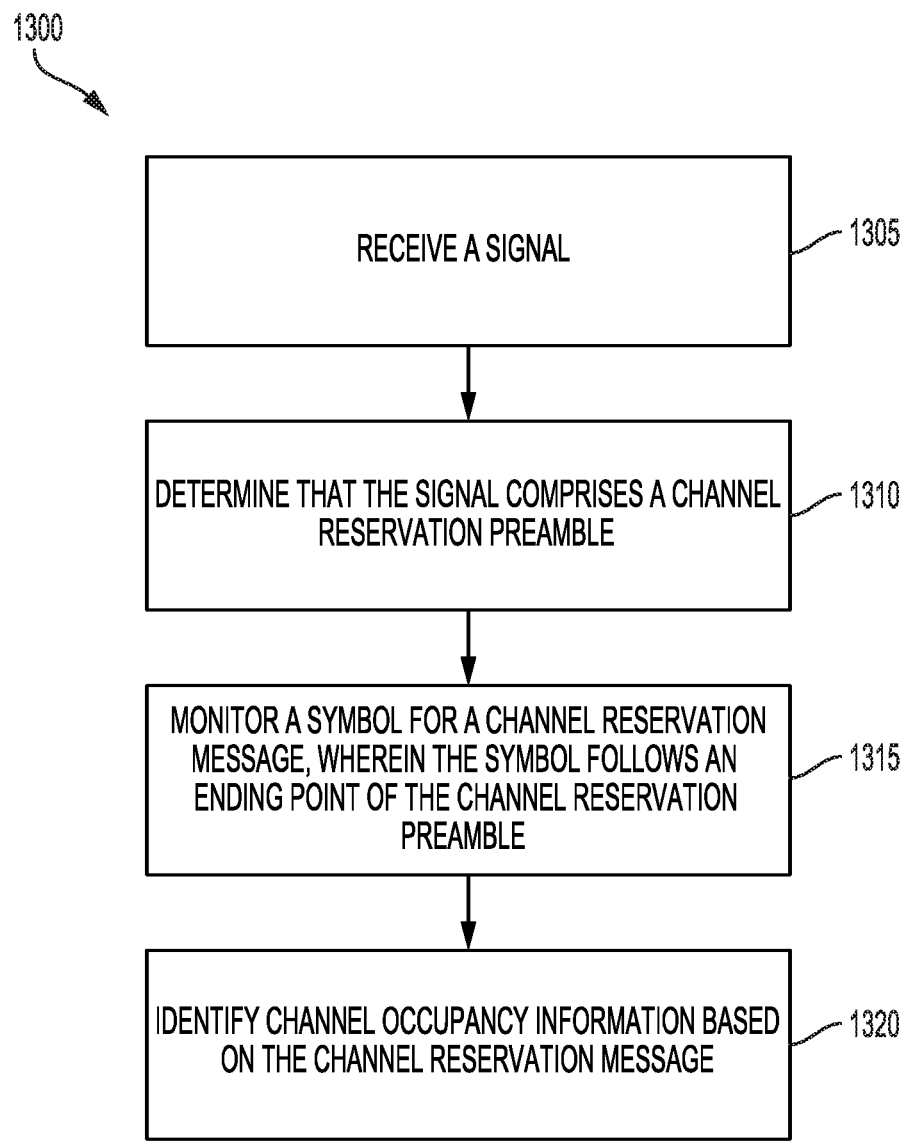
FIG. 13 illustrates a method of reception and processing of adaptive CR signaling in accordance with aspects of the present disclosure.

FIG. 13 shows a flowchart illustrating a process 1300 for adaptive channel reservation signals in accordance with various aspects of the present disclosure. The operations of process 1300 may be implemented by a device such as a base station or its components, or a UE or its components, as described with reference to FIGS. 1 and 2. For example, the operations of process 1300 may be performed by the processor 240 or processor 280, either alone or in combination with other components, as described herein. In some examples, the base station 105 or UE 115 may execute a set of codes to control the functional elements of the device to perform the functions described below. Additionally or alternatively, the base station 105 or UE 115 may perform aspects of the functions described below using special-purpose hardware.

At 1305, the base station 105 or UE 115 receives a signal. At 1310, the base station 105 or UE 115 determines that the signal comprises a channel reservation preamble. At 1315, the base station 105 or UE 115 monitor a symbol for a channel reservation message, wherein the symbol follows an ending point of the channel reservation preamble. At 1320, the base station 105 or UE 115 identify channel occupancy information based on the channel reservation message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 2 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:
   obtaining channel access after a clear channel assessment (CCA) operation;
   determining an offset between a boundary of a symbol and a particular time at which the channel access is obtained;
   generating a channel reservation (CR) preamble based on the offset, wherein the generating the CR preamble includes partitioning the CR preamble into a plurality of segments, each segment comprising a different waveform, and wherein the plurality of segments comprises a first segment having a fixed duration, a second segment having a variable duration, and a third segment having a fixed duration; and transmitting the CR preamble.

2. The method of claim 1, wherein the variable duration of the second segment is determined so that a total duration of the CR preamble aligns with a duration of the offset.

3. The method of claim 1, wherein the generating the CR preamble further comprises applying a different correlation type to each segment.

4. The method of claim 3, wherein the generating the CR preamble further comprises applying an auto correlation type to the first segment and a cross correlation type to the third segment.

5. A method comprising:

obtaining channel access after a clear channel assessment (CCA) operation;

determining an offset between a boundary of a symbol and a particular time at which the channel access is obtained;

generating a channel reservation (CR) preamble based on the offset, wherein the CR preamble comprises a dual layer waveform construction, and wherein the generating the CR preamble includes using a short spreading sequence for a first layer and a code cover sequence for a second layer of the CR preamble and further includes performing a cross product operation of the code cover sequence denoted by a length L vector with the short spreading sequence denoted by a length K vector; and transmitting the CR preamble.

6. The method of claim 5, wherein the offset has a duration shorter than a duration of the CR preamble.

7. The method of claim 6, further comprising truncating the CR preamble such that the CR preamble has a starting point aligned with the particular time and an ending point aligned with the boundary of the symbol.

8. The method of claim 6, further comprising aligning an ending point of the CR preamble with a boundary of a next symbol following the symbol and adding a filler signal between the particular time and a beginning of the CR preamble.

9. The method of claim 5, wherein the offset has a duration longer than a duration of the CR preamble.

10. The method of claim 9, further comprising adding at least one filler sample in a gap between an end of the CR preamble and the boundary of the symbol.

11. The method of claim 10, wherein the at least one filler sample comprises at least one of a copy of at least one sample from a beginning of the CR preamble, a copy of at least one sample from an end of a CR message scheduled for transmission in a next symbol following the symbol, or a PN-like signal.

12. An apparatus for wireless communication, comprising:

a processor;

memory in electronic communication with the processor; and instructions stored in the memory and operable, when executed by the processor, to cause the apparatus to:

obtain channel access after a clear channel assessment (CCA) operation;

determine an offset between a boundary of a symbol and a particular time at which the channel access is obtained;

generate a channel reservation (CR) preamble based on the offset, wherein the generating the CR preamble includes partitioning the CR preamble into a plurality of segments, each segment comprising a different waveform, and wherein the plurality of segments comprises a first segment having a fixed duration, a second segment having a variable duration, and a third segment having a fixed duration; and transmit the CR preamble.

13. The apparatus of claim 12, wherein the variable duration of the second segment is determined so that a total duration of the CR preamble aligns with a duration of the offset.

14. The apparatus of claim 12, further comprising applying a different correlation type to each segment.

15. The apparatus of claim 14, further comprising applying an auto correlation type to the first segment and a cross correlation type to the third segment.

16. An apparatus for wireless communication, comprising:

a processor;

memory in electronic communication with the processor; and instructions stored in the memory and operable, when executed by the processor, to cause the apparatus to:

obtain channel access after a clear channel assessment (CCA) operation;

determine an offset between a boundary of a symbol and a particular time at which the channel access is obtained;

generate a channel reservation (CR) preamble based on the offset, wherein the CR preamble comprises a dual layer waveform construction, and wherein the generating the CR preamble includes using a short spreading sequence for a first layer and a code cover sequence for a second layer of the CR preamble and further includes performing a cross product operation of the code cover sequence denoted by a length L vector with the short spreading sequence denoted by a length K vector.

17. The apparatus of claim 16, wherein the offset has a duration shorter than a duration of the CR preamble.

18. The apparatus of claim 17, further comprising truncating the CR preamble such that the CR preamble has a starting point aligned with the particular time and an ending point aligned with the boundary of the symbol.

19. The apparatus of claim 17, further comprising aligning an ending point of the CR preamble with a boundary of a next symbol following the symbol and adding a filler signal between the particular time and a beginning of the CR preamble.

20. The apparatus of claim 16, wherein the offset has a duration longer than a duration of the CR preamble.

21. The apparatus of claim 20, further comprising adding at least one filler sample in a gap between an end of the CR preamble and the boundary of the symbol.

22. The apparatus of claim 21, wherein the at least one filler sample comprises at least one of a copy of at least one sample from a beginning of the CR preamble, a copy of at least one sample from an end of a CR message scheduled for transmission in a next symbol following the symbol, or a PN-like signal.

23. A non-transitory computer-readable medium storing code for wireless communication, the code comprising instructions executable to:

obtain channel access after a clear channel assessment (CCA) operation;

determine an offset between a boundary of a symbol and a particular time at which the channel access is obtained;

generate a channel reservation (CR) preamble based on the offset, wherein the generating the CR preamble includes partitioning the CR preamble into a plurality of segments, each segment comprising a different waveform, and wherein the plurality of segments comprises a first segment having a fixed duration, a second segment having a variable duration, and a third segment having a fixed duration; and transmit the CR preamble.

24. An apparatus for wireless communication, comprising:

means for obtaining channel access after a clear channel assessment (CCA) operation;

means for determining an offset between a boundary of a symbol and a particular time at which the channel access is obtained;

means for generating a channel reservation (CR) preamble based on the offset, wherein the means for generating the CR preamble includes means for partitioning the CR preamble into a plurality of segments, each segment comprising a different waveform, and wherein the plurality of segments comprises a first segment having a fixed duration, a second segment having a variable duration, and a third segment having a fixed duration; and means for transmitting the CR preamble.

25. A non-transitory computer-readable medium storing code for wireless communication, the code comprising instructions executable to:

obtain channel access after a clear channel assessment (CCA) operation;

determine an offset between a boundary of a symbol and a particular time at which the channel access is obtained;

generate a channel reservation (CR) preamble based on the offset, wherein the CR preamble comprises a dual layer waveform construction, and wherein the generating the CR preamble includes using a short spreading sequence for a first layer and a code cover sequence for a second layer of the CR preamble and further includes performing a cross product operation of the code cover sequence denoted by a length L vector with the short spreading sequence denoted by a length K vector; and transmitting the CR preamble.

26. An apparatus for wireless communication, comprising:

means for obtaining channel access after a clear channel assessment (CCA) operation;

means for determining an offset between a boundary of a symbol and a particular time at which the channel access is obtained;

means for generating a channel reservation (CR) preamble based on the offset, wherein the CR preamble comprises a dual layer waveform construction, and wherein the generating the CR preamble includes using a short spreading sequence for a first layer and a code cover sequence for a second layer of the CR preamble and further includes performing a cross product operation of the code cover sequence denoted by a length L vector with the short spreading sequence denoted by a length K vector; and transmitting the CR preamble.

* * * * *